(12) United States Patent
Noguchi (10) Patent No.: US 9,719,573 B2
(45) Date of Patent: Aug. 1, 2017

(54) SHOCK ABSORBER

(71) Applicant: KAYABA INDUSTRY CO., LTD., Tokyo (JP)

(72) Inventor: Nobuhiro Noguchi, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/652,458

(22) PCT Filed: Jan. 29, 2014

(86) PCT No.: PCT/JP2014/051987
§ 371 (c)(1),
(2) Date: Jun. 16, 2015

(87) PCT Pub. No.: WO2014/119621
PCT Pub. Date: Aug. 7, 2014

(65) Prior Publication Data
US 2015/0323036 A1 Nov. 12, 2015

(30) Foreign Application Priority Data

Feb. 4, 2013 (JP) .................................. 2013-019046

(51) Int. Cl.
*F16F 9/44* (2006.01)
*F16F 9/512* (2006.01)
*F16F 9/348* (2006.01)

(52) U.S. Cl.
CPC .............. *F16F 9/512* (2013.01); *F16F 9/348* (2013.01); *F16F 9/446* (2013.01)

(58) Field of Classification Search
CPC ...... F16F 9/446; F16F 9/44; F16F 9/46; F16F 9/065; F16F 9/348; F16F 9/467;
(Continued)

(56) References Cited

U.S. PATENT DOCUMENTS 5,460,355 A * 10/1995 Danek ..................... F16F 9/512
267/218
5,873,437 A * 2/1999 Danek ................ B60G 17/0432
188/282.2
(Continued)

FOREIGN PATENT DOCUMENTS

JP 05092714 A * 4/1993
JP 05162523 A * 6/1993
(Continued)

*Primary Examiner* — Bradley King
*Assistant Examiner* — Stephen Bowes
(74) *Attorney, Agent, or Firm* — Rabin & Berdo, P.C.

(57) ABSTRACT

A shock absorber includes: a communication passage configured to cause a working fluid chamber formed in a cylinder to communicate with a reservoir for reserving a working fluid therein; a damping force generating mechanism configured to apply resistance to the working fluid passing through the communication passage; a low-speed compression-side damping adjuster configured to change a damping force when a stroke speed is in a low-speed range during compression; a high-speed compression-side damping adjuster configured to change the damping force when the stroke speed is in a high-speed range, the high-speed range representing higher speed than the low-speed range during compression; and an extension-side damping adjuster configured to change the damping force during extension. The low-speed compression-side damping adjuster, the high-speed compression-side damping adjuster, and the extension-side damping adjuster are attached to a tank side of the cylinder.

5 Claims, 6 Drawing Sheets (58) Field of Classification Search
CPC ............... F16F 9/468; B60G 2202/415; B60G 2202/413; B60G 2202/154; B60G 17/08; B60G 17/0152
See application file for complete search history.

(56) References Cited

U.S. PATENT DOCUMENTS

| | | | |
|---|---|---|---|
| 2009/0138157 A1* | 5/2009 | Hagglund | B60G 13/14 701/38 |
| 2013/0207327 A1* | 8/2013 | Besliu | B64C 25/505 267/140.13 |

FOREIGN PATENT DOCUMENTS

| | | |
|---|---|---|
| JP | 2001-099215 A | 4/2001 |
| JP | 2007-076480 A | 3/2007 |
| JP | 2011-012806 A | 1/2011 |
| JP | 2011-208783 A | 10/2011 |

* cited by examiner

SHOCK ABSORBER

TECHNICAL FIELD

The present invention relates to a shock absorber.

BACKGROUND ART

A shock absorber damps vibration applied to a vehicle, a device, a structure, and the like. JP2011-12806A discloses a shock absorber interposed between a vehicle body and a vehicle wheel of a vehicle in parallel to a suspension spring. The suspension spring absorbs shock caused by road surface irregularity. The shock absorber suppresses extension and compression of the suspension spring associated with shock absorption. This causes to suppress transmission of shock caused by the road surface irregularity to the vehicle body.

Moreover, the foregoing shock absorber includes an extension-side damping adjuster that changes an extension-side damping force generated during extension of the shock absorber, and a compression-side damping adjuster that changes a compression-side damping force generated during compression of the shock absorber.

Both the extension-side damping adjuster and the compression-side damping adjuster are provided to a tank side of the shock absorber. For this reason, it is possible to easily adjust both the extension-side damping force and the compression-side damping force compared with the case in which the extension-side damping adjuster and the compression-side damping adjuster are respectively arranged separately on a piston rod side and a tank side of the shock absorber.

SUMMARY OF INVENTION

Here, with respect to the compression-side damping force generated during compression of the shock absorber, there is a demand for separately adjusting a compression-side low-speed damping force in a case where a stroke speed of the shock absorber is in a low-speed range and a compression-side high-speed damping force in a case where the stroke speed is in a high-speed range.

It is an object of the present invention to provide a shock absorber capable of easily adjusting three types of damping forces including a compression-side low-speed damping force, a compression-side high-speed damping force, and an extension-side damping force.

According to an aspect of the present invention, a shock absorber includes: a cylinder, a proximal end portion of the cylinder being coupled to one of a vehicle body side and a vehicle wheel side; a working fluid chamber formed in the cylinder, the working fluid chamber being filled with a working fluid; a piston rod configured to be movable within the working fluid chamber in an axial direction, a proximal end portion of the piston rod being coupled to the other of the vehicle body side and the vehicle wheel side; a tank coupled to a proximal end side of the cylinder; a reservoir formed in the tank, the reservoir being configured to reserve the working fluid therein; a communication passage configured to cause the working fluid chamber to communicate with the reservoir; a damping force generating mechanism configured to apply resistance to the working fluid passing through the communication passage; a low-speed compression-side damping adjuster configured to change a damping force when a stroke speed is in a low-speed range during compression of the shock absorber; a high-speed compression-side damping adjuster configured to change the damping force when the stroke speed is in a high-speed range during compression of the shock absorber, the high-speed range representing higher speed than that in the low-speed range; and an extension-side damping adjuster configured to change the damping force during extension of the shock absorber. The low-speed compression-side damping adjuster, the high-speed compression-side damping adjuster, and the extension-side damping adjuster are attached to a tank side of the cylinder.

DESCRIPTION OF EMBODIMENTS

Hereinafter, an embodiment of the present invention will be described with reference to the accompanying drawings.

The same components or the corresponding components are respectively denoted by the same reference numerals applied throughout the drawings.

Figure 1:
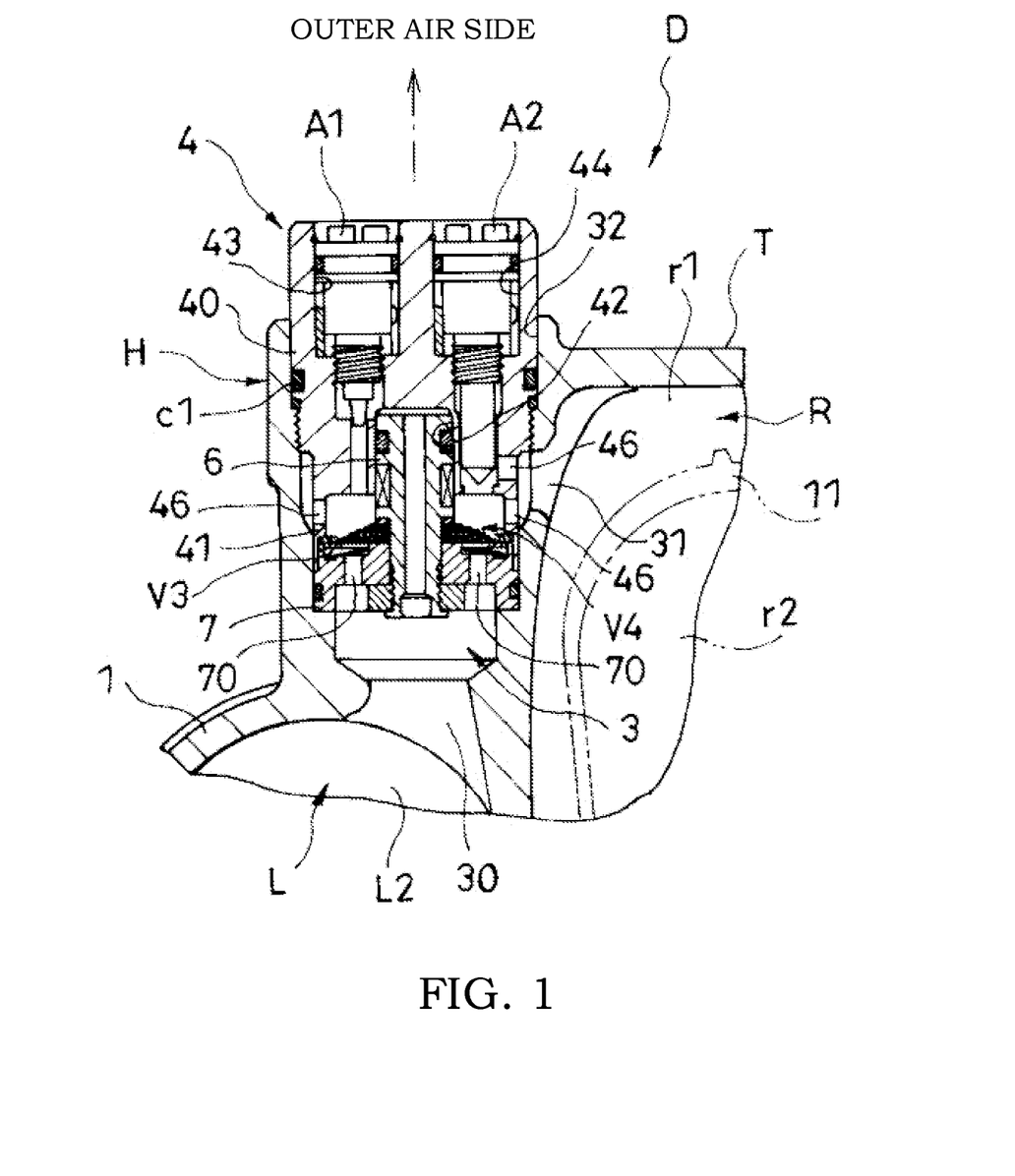
FIG. 1 is an enlarged cross-sectional view showing main elements of a shock absorber according to an embodiment of the present invention, and shows a cross section taken along the Z1-Z1 line of FIG. 2. Further, a bottom cap of FIG. 1 is illustrated as a cross section taken along the Z2-Z3 line of FIG. 4.

As shown in FIG. 1, a shock absorber D includes a cylinder 1, a working fluid chamber L, a piston rod 2 (FIG. 2), a tank T, a reservoir R, a communication passage 3, and a damping force generating mechanism. A proximal end portion of the cylinder 1 is coupled to a vehicle body side. The working fluid chamber L is formed in the cylinder 1 and is filled with a working fluid. A proximal end portion of the piston rod 2 is coupled to a vehicle wheel side. The piston rod 2 is movable within the working fluid chamber L in an axial direction. The tank T is coupled to a proximal end side of the cylinder 1. The reservoir R is formed in the tank T and reserves the working fluid therein. The working fluid chamber L is communicated with the reservoir R via the communication passage 3. The damping force generating mechanism applies predetermined resistance to the working fluid passing through the communication passage 3.

Figure 4:
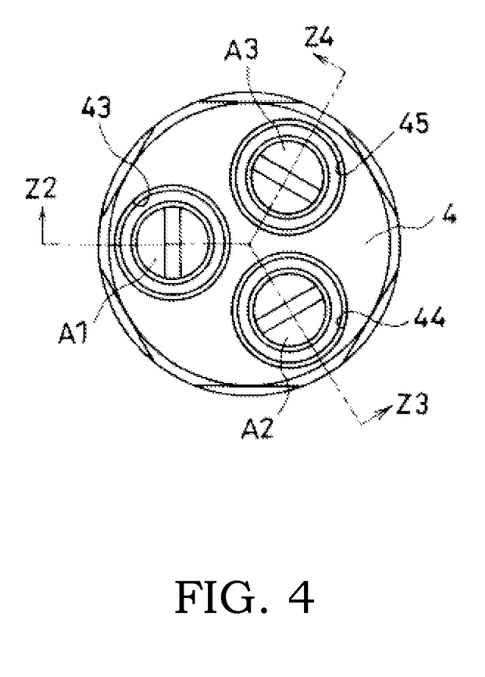
FIG. 4 is an enlarged view showing the bottom cap when viewed from a direction of an arrow Y of FIG. 2.
Figure 6:
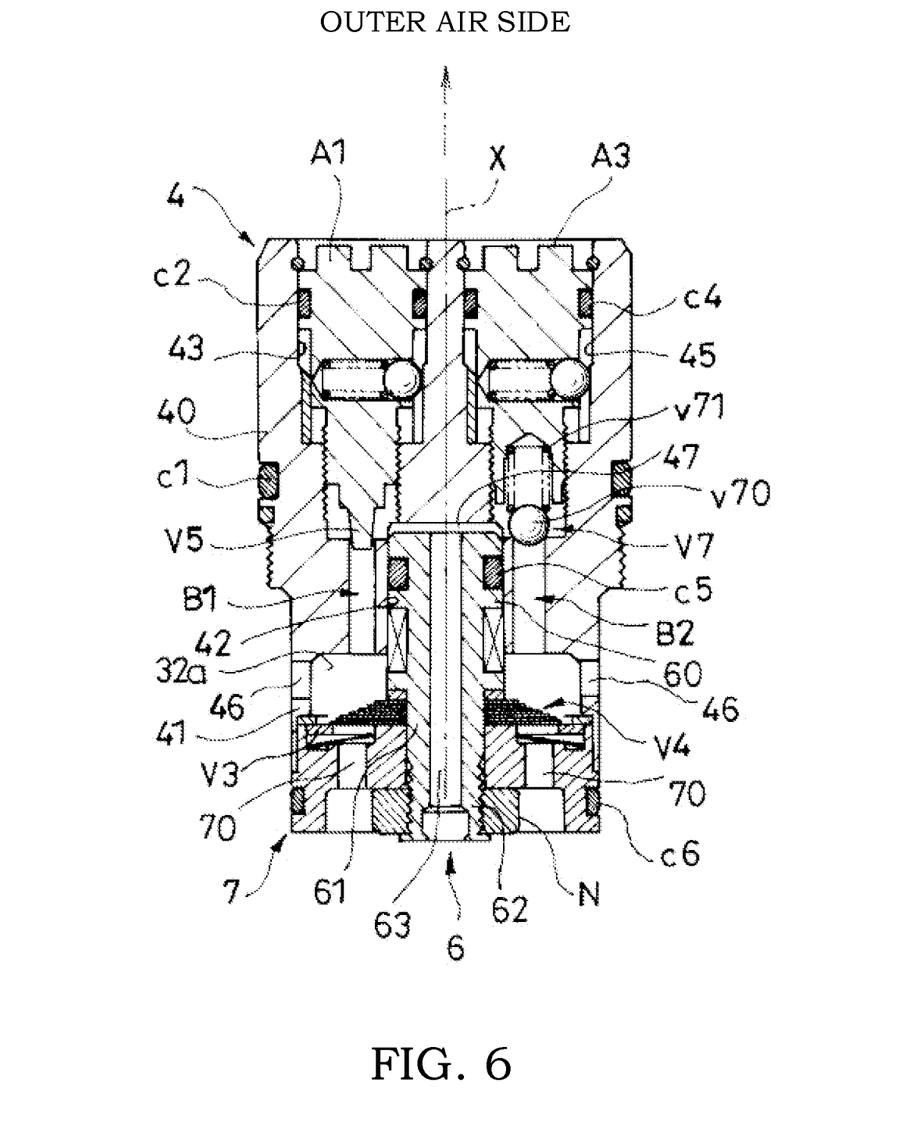
FIG. 6 is a cross-sectional view of the bottom cap, and shows a cross section taken along the Z2-Z4 line of FIG. 4.

The shock absorber D further includes a low-speed compression-side damping adjuster A1, a high-speed compression-side damping adjuster A2, and an extension-side damping adjuster A3 (FIGS. 4 and 6). The low-speed compression-side damping adjuster A1 changes a damping force when a stroke speed is in a low-speed range during compression. The high-speed compression-side damping adjuster A2 changes a damping force when the stroke speed is in a high-speed range during compression. The extension-side damping adjuster A3 changes a damping force during extension. The low-speed compression-side damping adjuster A1, the high-speed compression-side damping adjuster A2, and the extension-side damping adjuster A3 are attached to a tank side of the cylinder 1.

Figure 2:
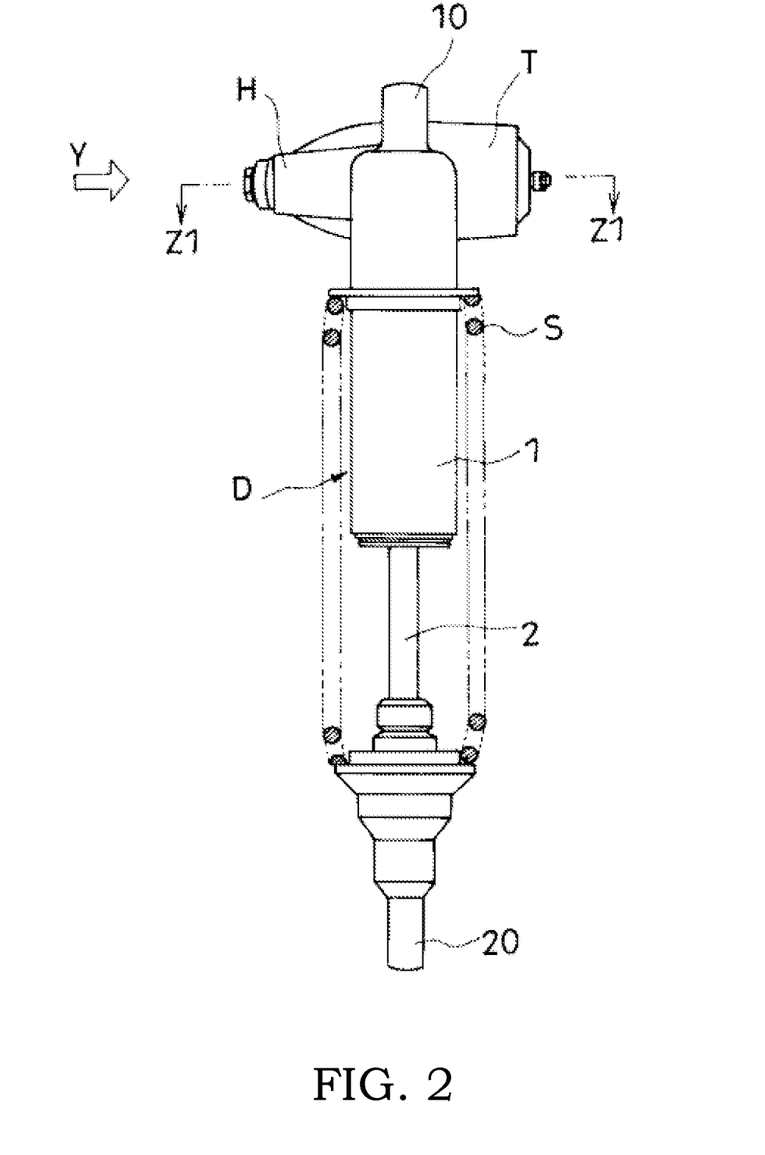
FIG. 2 is a front view showing an attached state of the shock absorber according to the embodiment of the present invention.

The shock absorber D is a shock absorber for a rear cushion unit that suspends a rear wheel in a saddle type vehicle, such as a two-wheeled vehicle and a three-wheeled vehicle. As shown in FIG. 2, the rear cushion unit includes the shock absorber D and a suspension spring S. The suspension spring S is arranged around an outer circumference of the shock absorber D and elastically supports the vehicle body.

A vehicle body side bracket 10 is fixed to the proximal end portion of the cylinder 1. The cylinder 1 is coupled to a vehicle body frame (not shown in the drawings), which serves as a framework of the vehicle body, via the vehicle body side bracket 10. A vehicle wheel side bracket 20 is fixed to the proximal end portion of the piston rod 2. The piston rod 2 is coupled to a swing arm (not shown in the drawings), which supports the rear wheel, via the vehicle wheel side bracket 20.

That is to say, the shock absorber D is installed in an inverted manner. The tank T coupled to the proximal end side of the cylinder 1 is arranged at the vehicle body side together with the low-speed compression-side damping adjuster A1, the high-speed compression-side damping adjuster A2 and the extension-side damping adjuster A3, which are attached to the tank side of the cylinder 1.

As shown in FIG. 1, the shock absorber D further includes a bottom cap 4, a piston 5 (FIG. 3), a center rod 6, and a base member 7. The bottom cap 4 is installed from an outer air side in the middle of the communication passage 3. The piston 5 is held by the piston rod 2, and is in slidable contact with an inner circumferential surface of the cylinder 1. The piston 5 partitions the working fluid chamber L into two rooms (L1, L2). The center rod 6 is held at a side opposite from an outer air side of the bottom cap 4. The base member 7 is held by the center rod 6 to partition the communication passage 3 into a working fluid chamber side and a reservoir side.

Figure 3:
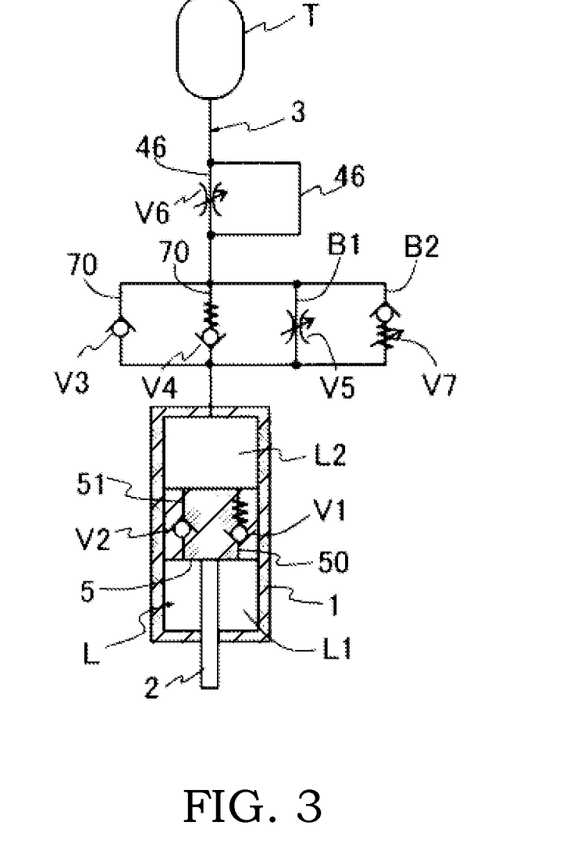
FIG. 3 is a view fundamentally showing the shock absorber according to the embodiment of the present invention.

As shown in FIG. 3, of the two rooms (L1, L2) partitioned by the piston 5, a room formed at a piston rod side is an extension-side chamber L1, and a room formed at a piston side is a compression-side chamber L2. An extension-side piston flow passage 50 and a compression-side piston flow passage 51 are formed in the piston 5. The extension-side chamber L1 communicate with the compression-side chamber L2 via the extension-side piston flow passage 50 or the compression-side piston flow passage 51. Moreover, an extension-side damping valve V1 and a compression-side check valve V2 are attached to the piston 5. The extension-side damping valve V1 permits the working fluid only to move from the extension-side chamber L1 to the compression-side chamber L2 by passing through the extension-side piston flow passage 50. The extension-side damping valve V1 applies predetermined resistance to the working fluid passing through the extension-side piston flow passage 50. The compression-side check valve V2 permits the working fluid only to move from the compression-side chamber L2 to the extension-side chamber L1 by passing through the compression-side piston flow passage 51.

As shown in FIG. 2, the tank T is coupled to a side surface of an upper portion at the proximal end side of the cylinder 1 via a coupling part H. As shown in FIG. 1, the reservoir R formed in the tank T is composed of a reservoir liquid chamber r1 filled with the working fluid and a reservoir gas chamber r2 filled with gas. A bladder 11 partitions the reservoir R into the reservoir liquid chamber r1 and the reservoir gas chamber r2.

The communication passage 3, via which the reservoir R communicate with the working fluid chamber L, is formed in the coupling part H that connects the cylinder 1 and the tank T. The communication passage 3 includes a working fluid chamber side passage 30, a reservoir side passage 31, and an attachment hole 32. The working fluid chamber side passage 30 is opened to the compression-side chamber L2. The reservoir side passage 31 is opened to the reservoir liquid chamber r1. The attachment hole 32 is formed between the working fluid chamber side passage 30 and the reservoir side passage 31 so as to be opened to the outer air side. The working fluid chamber side passage 30 is connected to a side opposite from an outer air side of the attachment hole 32, and the reservoir side passage 31 is connected to a lateral side of the attachment hole 32.

The bottom cap 4 is installed from the outer air side in the middle of the communication passage 3. The bottom cap 4 includes a sealing part 40, a tubular case part 41, a concave holding hole 42, a first shaft bore 43, a second shaft bore 44, a third shaft bore 45 (FIG. 4), and a plurality of lateral bores 46. An annular seal c1 is attached to an outer circumference of the sealing part 40. The sealing part 40 seals an opening of the attachment hole 32 at the outer air side. The case part 41 extends from an outer circumferential edge of the sealing part 40 toward a side opposite from the outer air side along the attachment hole 32. The holding hole 42 is formed in a central portion at a side opposite from an outer air side of the sealing part 40. The first shaft bore 43, the second shaft bore 44, and the third shaft bore 45 are formed such that they penetrate the sealing part 40 in the axial direction and are aligned in a circumferential direction. The plurality of lateral bores 46 penetrate the case part 41 in a radial direction.

Figure 5:
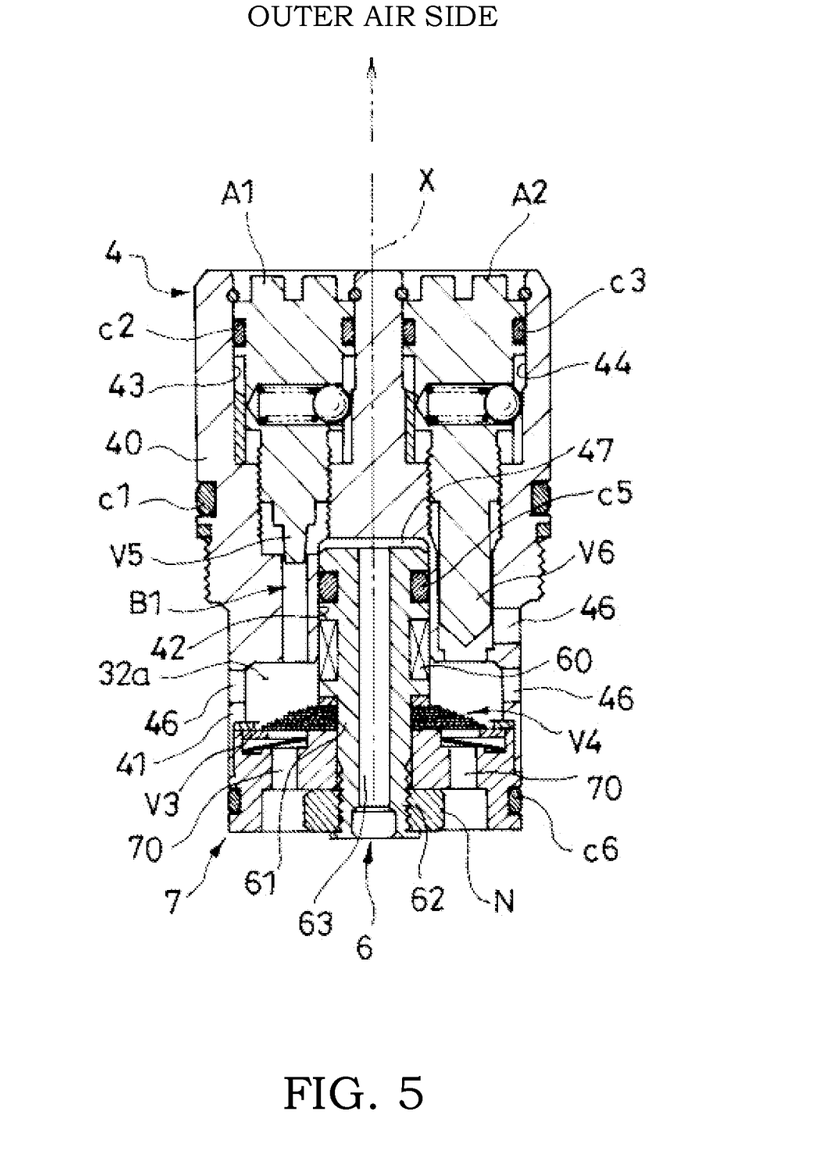
FIG. 5 is a cross-sectional view of the bottom cap, and shows a cross section taken along the Z2-Z3 line of FIG. 4.

As shown in FIGS. 5 and 6, the first shaft bore 43 is opened to the outer air side and an inner side of the case part 41, and an intermediate portion thereof is connected to the holding hole 42. A low-speed throttle valve V5 is inserted into the first shaft bore 43. The low-speed compression-side damping adjuster A1 is formed integrally with the low-speed throttle valve V5 and drives the low-speed throttle valve V5. The low-speed compression-side damping adjuster A1 is screwed into the first shaft bore 43 from the outer air side. An annular seal c2 is attached to an outer circumference of the low-speed compression-side damping adjuster A1. This causes an outer air side of the first shaft bore 43 from the intermediate portion to be sealed by the low-speed compression-side damping adjuster A1.

The low-speed throttle valve V5 is formed so as to become thinner toward a distal end, and the low-speed throttle valve V5 functions as an orifice that throttles the first shaft bore 43. An opening degree of the above orifice can be changed by operating the low-speed compression-side damping adjuster A1 to drive the low-speed throttle valve V5.

As shown in FIG. 5, the second shaft bore 44 is opened to the outer air side and the inner side of the case part 41 similarly to the first shaft bore 43, but an intermediate portion thereof is not connected to the holding hole 42. A high-speed throttle valve V6 is inserted into the second shaft bore 44. The high-speed compression-side damping adjuster A2 is formed integrally with the high-speed throttle valve V6 and drives the high-speed throttle valve V6. The high-speed compression-side damping adjuster A2 is screwed into the second shaft bore 44 from the outer air side. An annular seal c3 is attached to an outer circumference of the high-speed compression-side damping adjuster A2. This causes an outer air side of the second shaft bore 44 from the intermediate portion to be sealed by the high-speed compression-side damping adjuster A2.

The high-speed throttle valve V6 openably and closably seals one of the plurality of lateral bores 46 formed in the case part 41. An opening degree of this lateral bore 46 can be changed by operating the high-speed compression-side damping adjuster A2 to drive the high-speed throttle valve V6.

As shown in FIG. 6, similarly to the first shaft bore 43, the third shaft bore 45 is opened to the outer air side and the inner side of the case part 41, and an intermediate portion thereof is continuous with the holding hole 42. An extension-side damping valve V7, which serves as an extension-side check valve, is housed in the third shaft bore 45. The extension-side damping adjuster A3 changes a valve opening pressure of the extension-side damping valve V7. The extension-side damping adjuster A3 is screwed into the third shaft bore 45 from the outer air side. An annular seal c4 is attached to an outer circumference of the extension-side damping adjuster A3. This causes an outer air side of the third shaft bore 45 from the intermediate portion is sealed by the extension-side damping adjuster A3.

The extension-side damping valve V7 includes a valve body v70 and a biasing spring v71. The valve body v70 openably and closably seals the third shaft bore 45. The biasing spring v71 biases the valve body v70 toward a closing direction. The extension-side damping valve V7 permits the working fluid only to move from a third shaft bore side to a holding hole side to apply predetermined resistance to the working fluid passing through the third shaft bore 45. A spring force of the biasing spring v71 can be changed by operating the extension-side damping adjuster A3.

As shown in FIGS. 5 and 6, the center rod 6, which is held at the side opposite from the outer air side of the bottom cap 4, includes a proximal end part 60, an attachment part 61, a screw part 62, and a center rod through-hole 63. The proximal end part 60 is inserted into the holding hole 42. The attachment part 61 is connected to a side of the proximal end part 60 opposite from the bottom cap 4. The attachment part 61 is formed so as to have a smaller diameter than the proximal end part 60. The screw part 62 is connected to a side of the attachment part 61 opposite from the bottom cap 4. A screw groove is formed on an outer circumference of the screw part 62. The center rod through-hole 63 penetrates the center rod 6 in the axial direction.

An end surface of the proximal end part 60 of the center rod 6 at a bottom cap side (an upper surface in FIGS. 5 and 6) is not in contact with the bottom cap 4. A gap 47 is provided between the center rod 6 and the bottom cap 4. An annular seal c5 is attached to an outer circumference of the proximal end part 60 of the center rod 6. This causes an opening of the gap 47 at a lower side in FIGS. 5 and 6 is sealed by the center rod 6.

The center rod through-hole 63 is opened to the gap 47 and the working fluid chamber side passage 30 (FIG. 1). The center rod through-hole 63 communicates with the first shaft bore 43 and the third shaft bore 45 via the gap 47, and also communicates with the compression-side chamber L2 via the working fluid chamber side passage 30.

As shown in FIGS. 5 and 6, the base member 7 held by the center rod through-hole 63 is formed in an annular shape and is held around an outer circumference of the attachment part 61 of the center rod 6. An annular seal c6 is attached to an outer circumference of the base member 7. The base member 7 partitions the communication passage 3 into the working fluid chamber side and the reservoir side by separating the working fluid chamber side passage 30 from the attachment hole 32 in the communication passage 3.

The base member 7 is fixedly interposed between a nut N screwed onto the screw part 62 of the center rod 6 and the proximal end part 60. An upper portion of the base member 7 in FIGS. 5 and 6 is inserted into a distal end portion of the case part 41 of the bottom cap 4. A fluid pool chamber 32a is defined in the attachment hole 32. The fluid pool chamber 32a is a space between the bottom cap 4 and the base member 7. The fluid pool chamber 32a communicates with the reservoir liquid chamber r1 via the plurality of lateral bores 46 formed in the case part 41 and the reservoir side passage 31.

A base member flow passage 70 that penetrates the base member 7 in the axial direction is formed in the base member 7. The base member flow passage 70 is opened to the fluid pool chamber 32a and the working fluid chamber side passage 30. The base member flow passage 70 communicates with the reservoir liquid chamber r1 via the fluid pool chamber 32a and the lateral bores 46, and also communicates with the compression-side chamber L2 via the working fluid chamber side passage 30.

An extension-side check valve V3 and a compression-side damping valve V4 are attached to the base member 7. The extension-side check valve V3 permits the working fluid only to move from the reservoir liquid chamber r1 to the compression-side chamber L2 by passing through the base member flow passage 70. The compression-side damping valve V4 permits the working fluid only to move from the compression-side chamber L2 to the reservoir liquid chamber r1 by passing through the base member flow passage 70 to apply predetermined resistance to the working fluid passing through the base member flow passage 70.

The first shaft bore 43 and the third shaft bore 45, which communicate with the compression-side chamber L2 via the center rod through-hole 63, are opened to the fluid pool chamber 32a. A first bypass flow passage B1 bypasses the base member flow passage 70 to cause the compression-side chamber L2 to communicate with the reservoir liquid chamber r1. The first bypass flow passage B1 is constituted by the center rod through-hole 63, the gap 47, and the first shaft bore 43. A second bypass flow passage B2 bypasses the base member flow passage 70 to cause the compression-side chamber L2 communicate with the reservoir liquid chamber r1. The second bypass flow passage B2 is constituted by the center rod through-hole 63, the gap 47, and the third shaft bore 45. The low-speed throttle valve V5 is provided in the middle of the first bypass flow passage B1, and the extension-side damping valve V7 is provided in the middle of the second bypass flow passage B2.

The communication passage 3, via which the working fluid chamber L communicate with the reservoir R, is provided with the base member flow passage 70, the first bypass flow passage B1, and the second bypass flow passage B2, into which the communication passage 3 branches at the base member 7, as shown in FIG. 3. The base member flow passage 70, the first bypass flow passage B1, and the second bypass flow passage B2 are arranged in parallel, and join again in the fluid pool chamber 32a. The working fluid that moves between the working fluid chamber L and the reservoir R by passing through the communication passage 3 passes through at least one of the base member flow passage 70, the first bypass flow passage B1, and the second bypass flow passage B2. The communication passage 3 is provided with the plurality of lateral bores 46, into which the communication passage 3 further branches at a reservoir side that is downstream of the compression-side damping valve V4. The plurality of lateral bores 46 are arranged in parallel and join again in the reservoir side passage 31.

The compression-side damping valve V4 and the extension-side check valve V3, which are provided in the base member flow passage 70, the high-speed throttle valve V6, which throttles one of the plurality of lateral bores 46, the low-speed throttle valve V5, which are provided in the first bypass flow passage B1, and the extension-side damping valve V7, which are provided in the second bypass flow passage B2, function as the damping force generating mechanism that applies the predetermined resistance to the working fluid passing through the communication passage 3.

Next, an operation of the shock absorber D according to the present embodiment will be described.

In a case where a stroke speed (piston speed) is in a high-speed range during extension of the shock absorber D where the piston rod 2 exits from the cylinder 1, the working fluid in the extension-side chamber L1 pressurized by the piston 5 causes the extension-side damping valve V1 attached to the piston 5 to open, and moves to the compression-side chamber L2 by passing through the extension-side piston flow passage 50.

At this time, the working fluid corresponding to a volume of the piston rod that has exited from the cylinder 1 causes the extension-side check valve V3 attached to the base member 7 to open, and passes through the base member flow passage 70 in the communication passage 3. This working fluid also causes the extension-side damping valve V7 attached to the bottom cap 4 to open, and passes through the second bypass flow passage B2 in the communication passage 3. This causes the working fluid to move from the reservoir liquid chamber r1 to the compression-side chamber L2.

For this reason, the shock absorber D generates an extension-side high-speed damping force caused by the resistance of the extension-side damping valves V1, V7 and the extension-side check valve V3. In this regard, since the resistance of the extension-side check valve V3 is set to low, the extension-side high-speed damping force is mainly caused by the resistance of the extension-side damping valves V1, V7.

Further, by changing the spring force of the biasing spring v71 using the extension-side damping adjuster A3 so as to change the valve opening pressure of the extension-side damping valve V7, the resistance applied when the working fluid passes through the communication passage 3 can be changed, and the extension-side high-speed damping force can thereby be adjusted.

In addition, during extension of the shock absorber D, the working fluid moves from the reservoir liquid chamber r1 to the compression-side chamber L2. For this reason, by expanding the reservoir gas chamber r2, a change in a cylinder volume corresponding to exit of the piston rod is compensated.

On the other hand, in a case where the stroke speed (piston speed) is in a low-speed range during compression of the shock absorber D where the piston rod 2 enters the inside of the cylinder 1, the working fluid in the compression-side chamber L2 pressurized by the piston 5 causes the compression-side check valve V2 attached to the piston 5 to open, and the working fluid moves to the extension-side chamber L1 by passing through the compression-side piston flow passage 51.

At this time, since the compression-side damping valve V4 attached to the base member 7 is not opened, the working fluid corresponding to a volume of the piston rod that has entered the inside of the cylinder 1 moves from the compression-side chamber L2 to the reservoir liquid chamber r1 by passing through the first bypass flow passage B1 in the communication passage 3.

Therefore, the shock absorber D generates a compression-side low-speed damping force caused by the resistance of the compression-side check valve V2 and the low-speed throttle valve V5. In this regard, since the resistance of the compression-side check valve V2 is set to low, the compression-side low-speed damping force is mainly caused by the resistance of the orifice formed by the low-speed throttle valve V5.

Further, by driving the low-speed throttle valve V5 using the low-speed compression-side damping adjuster A1 so as to change the opening degree of the orifice formed by the low-speed throttle valve V5, the shock absorber D can change the resistance applied when the working fluid passes through the communication passage 3, and thereby adjust the compression-side low-speed damping force.

On the other hand, in a case where the stroke speed (piston speed) is in the high-speed range during compression of the shock absorber D, the working fluid in the compression-side chamber L2 pressurized by the piston 5 causes the compression-side check valve V2 attached to the piston 5 to open, and moves to the extension-side chamber L1 by passing through the compression-side piston flow passage 51.

At this time, the working fluid corresponding to a volume of the piston rod that has entered the inside of the cylinder 1 opens the compression-side damping valve V4 attached to the base member 7, whereby the working fluid passes through the base member flow passage 70 in the communication passage 3 and through the lateral bores 46, and moves from the compression-side chamber L2 to the reservoir liquid chamber r1.

For this reason, the shock absorber D generates a compression-side high-speed damping force caused by the resistance of the compression-side check valve V2, the compression-side damping valve V4, and the high-speed throttle valve V6. In this regard, since the resistance of the compression-side check valve V2 is set to low, the compression-side high-speed damping force is mainly caused by the resistance of the compression-side damping valve V4 and the high-speed throttle valve V6.

Further, by changing an opening degree of one of the lateral bores 46 using the high-speed compression-side damping adjuster A2 so as to change a flow passage area of the communication passage 3 at a downstream side of the compression-side damping valve V4, the shock absorber D can change the resistance applied when the working fluid passes through the communication passage 3, and thereby adjust the compression-side high-speed damping force.

In addition, during compression of the shock absorber D, the working fluid moves from the compression-side chamber L2 to the reservoir liquid chamber r1. For this reason, by contracting the reservoir gas chamber r2, a change in a cylinder volume corresponding to entrance of the piston rod is compensated.

Although a range of the stroke speed is classified into the low-speed range and the high-speed range in the above description, a threshold value for each range can be set in an arbitrary manner.

Next, functions and effects of the shock absorber D according to the present embodiment will be described.

The shock absorber D includes the cylinder 1, the working fluid chamber L, the piston rod 2 (FIG. 2), the tank T, the reservoir R, the communication passage 3, and the damping force generating mechanism. The proximal end portion of the cylinder 1 is coupled to the vehicle body side. The working fluid chamber L is formed in the cylinder 1 and is filled with the working fluid. The proximal end portion of the piston rod 2 is coupled to the vehicle wheel side. The piston rod 2 is movable within the working fluid chamber L in the axial direction. The tank T is coupled to the proximal end side of the cylinder 1. The reservoir R is formed in the tank T and reserves the working fluid therein. The working fluid chamber L communicates with the reservoir R via the communication passage 3. The damping force generating mechanism applies the predetermined resistance to the working fluid passing through the communication passage 3.

The shock absorber D further includes the low-speed compression-side damping adjuster A1, the high-speed compression-side damping adjuster A2, and the extension-side damping adjuster A3 (FIGS. 4 and 6). The low-speed compression-side damping adjuster A1 changes the damping force when the stroke speed is in the low-speed range during compression (the compression-side low-speed damping force). The high-speed compression-side damping adjuster A2 changes the damping force when the stroke speed is in the high-speed range during compression (the compression-side high-speed damping force). The extension-side damping adjuster A3 changes the damping force during extension (the extension-side high-speed damping force). Therefore, the shock absorber D can easily adjust the three types of damping forces including the compression-side low-speed damping force, the compression-side high-speed damping force, and the extension-side damping force (extension-side high-speed damping force).

Moreover, the low-speed compression-side damping adjuster A1, the high-speed compression-side damping adjuster A2, and the extension-side damping adjuster A3 are attached to the tank side of the cylinder 1. Therefore, all of the low-speed compression-side damping adjuster A1, the high-speed compression-side damping adjuster A2, and the extension-side damping adjuster A3 can be operated from the tank side, and this makes it possible to easily adjust the three types of damping forces including the compression-side low-speed damping force, the compression-side high-speed damping force, and the extension-side damping force (extension-side high-speed damping force).

The shock absorber D further includes the bottom cap 4 that is installed from the outer air side in the middle of the communication passage 3. The low-speed compression-side damping adjuster A1, the high-speed compression-side damping adjuster A2, and the extension-side damping adjuster A3 are attached to the bottom cap 4, and arranged so as to be aligned in the circumferential direction of the bottom cap 4. Therefore, compared with the case in which a part or all of the adjusters A1, A2, A3 are coaxially arranged, the configurations of the adjusters A1, A2, A3 can be simplified and the operabilities of the adjusters A1, A2, A3 can be improved.

The shock absorber D further includes the piston 5, the center rod 6, and the base member 7. The piston 5 is held at the distal end of the piston rod 2 and partitions the working fluid chamber L into two rooms (the extension-side chamber L1 and the compression-side chamber L2). The center rod 6 is held at the side opposite from the outer air side of the bottom cap 4. The base member 7 is held by the center rod 6 and partitions the communication passage 3 into the working fluid chamber side and the reservoir side.

The base member flow passage 70 is formed in the base member 7. The base member flow passage 70 is provided in the middle of the communication passage 3 and penetrates the base member 7. One of the rooms in the working fluid chamber L (the compression-side chamber L2) communicates with the reservoir R via the base member flow passage 70. The compression-side damping valve V4 is attached to the base member 7. In a case where the stroke speed is in the high-speed range, the compression-side damping valve V4 is opened to apply the predetermined resistance to the working fluid that passes through the base member flow passage 70 to move from one of the rooms in the working fluid chamber L (the compression-side chamber L2) to the reservoir R.

The high-speed throttle valve V6 is attached to the bottom cap 4. The high-speed throttle valve V6 changes the flow passage area of the communication passage 3 at the downstream side of the compression-side damping valve V4. The high-speed throttle valve V6 is driven by the high-speed compression-side damping adjuster A2.

Here, for example, it is preferable to provide the high-speed compression-side damping adjuster A2 on a central line X of the bottom cap 4 in a case of a configuration in which a biasing spring is provided on a rear surface of the compression-side damping valve V4 (an upper side in FIG. 1) and the compression-side high-speed damping force is changed by changing a biasing force of this biasing spring using the high-speed compression-side damping adjuster A2 so as to change a valve opening pressure of the compression-side damping valve V4.

However, in the present embodiment, by adopting the above-described configuration, the high-speed compression-side damping adjuster A2 can easily be arranged at a position displaced from the central line X of the bottom cap 4. This makes it easy to align the adjusters A1, A2, A3 in the circumferential direction.

The shock absorber D1 further includes the first bypass flow passage B1 and the low-speed throttle valve V5. The first bypass flow passage B1 is provided in the middle of the communication passage 3. The first bypass flow passage B1 causes one of the rooms in the working fluid chamber L (the compression-side chamber L2) to communicate with the reservoir R by passing through the center rod 6 and the bottom cap 4 and bypassing the base member flow passage 70. The low-speed throttle valve V5 is attached to the bottom cap 4 and forms the orifice that throttles the first bypass flow passage B1. The low-speed throttle valve V5 is driven by the low-speed compression-side damping adjuster A1.

That is to say, the communication passage 3 is provided with the base member flow passage 70 and the first bypass flow passage B1. The communication passage 3 branches at the base member 7 into the base member flow passage 70 and the first bypass flow passage B1 that are arranged in parallel. For this reason, the compression-side low-speed damping force and the compression-side high-speed damping force can easily be adjusted separately.

Moreover, as the first bypass flow passage B1 passes through the inside of the bottom cap 4, the low-speed throttle valve V5, as well as the low-speed compression-side damping adjuster A1 that drives the low-speed throttle valve V5, can easily be arranged at a portion displaced from the central line X of the bottom cap 4. This makes it easy to align the adjusters A1, A2, A3 in the circumferential direction.

The shock absorber D further includes the second bypass flow passage B2 and the extension-side damping valve V7. The second bypass flow passage B2 is provided in the middle of the communication passage 3. The second bypass flow passage B2 causes one of the rooms in the working fluid chamber L (the compression-side chamber L2) to communicate with the reservoir R by passing through the center rod 6 and the bottom cap 4 and bypassing the base member flow passage 70. The extension-side damping valve V7 is attached to the bottom cap 4. The extension-side damping valve V7 permits the working fluid only to move from the reservoir R to one of the rooms in the working fluid chamber L (the compression-side chamber L2) by passing through the second bypass flow passage B2.

The extension-side damping valve V7 includes the valve body v70 and the biasing spring v71. The valve body v70 openably and closably seals the second bypass flow passage B2. The biasing spring v71 biases the valve body v70 toward the closing direction. The spring force of the biasing spring v71 is changed by the extension-side damping adjuster A3.

That is to say, the communication passage 3 is provided with the base member flow passage 70 and the second bypass flow passage B2. The communication passage 3 branches at the base member 7 into the base member flow passage 70 and the second bypass flow passage B2 that are arranged in parallel. For this reason, the compression-side high-speed damping force and the extension-side damping force (extension-side high-speed damping force) can easily be adjusted separately.

Moreover, since the second bypass flow passage B2 passes through the inside of the bottom cap 4, the extension-side damping valve V7 and the extension-side damping adjuster A3 that changes the valve opening pressure of the extension-side damping valve V7 can easily be arranged at a portion displaced from the central line X of the bottom cap 4. This makes it easy to align the adjusters A1, A2, A3 in the circumferential direction.

Furthermore, the shock absorber D is installed in the inverted manner in which the cylinder 1 is coupled to the vehicle body side and the piston rod 2 is coupled to the vehicle wheel side. Therefore, the tank T attached to the proximal end side of the cylinder 1, the communication passage 3, and the adjusters A1, A2, A3, are also arranged at the vehicle body side. For this reason, compared with the case in which the adjusters A1, A2, A3 are arranged at the vehicle wheel side, the operabilities of the adjusters A1, A2, A3 can be improved.

Moreover, the bottom cap 4 includes the sealing part 40 and the case part 41. The sealing part 40 seals the opening of the communication passage 3 at the outer air side. The case part 41 extends from the outer circumferential edge of the sealing part 40 toward the side opposite from the outer air side. The base member 7 is coupled to the distal end portion of the case part 41. The plurality of lateral bores 46 that penetrates the case part 41 to the inside and outside of the case part 41 are formed in the case part 41. The high-speed throttle valve V6 openably and closably seals one of the plurality of lateral bores 46. In this way, even if the high-speed throttle valve V6 completely closes one of the lateral bores 46, the working fluid can move inside and outside the case part 41 by passing through other lateral bores 46. Therefore, it is possible to prevent the high-speed throttle valve V6 from excessively throttling the flow passage area of the communication passage 3. This makes it possible to suppress an influence on the compression-side low-speed damping force and the extension-side damping force.

The embodiment of the present invention has been described above, but the above embodiment is merely an example of application of the present invention, and the technical scope of the present invention is not limited to the specific configurations of the above embodiments.

For example, in the embodiment described above, the shock absorber D is described as the shock absorber for the rear cushion that suspends the rear wheel in the saddle type vehicle. However, the shock absorber D may be a shock absorber for other vehicles, such as automobiles.

Moreover, in the embodiment described above, the shock absorber D is installed in the inverted manner in which the cylinder 1 is coupled to the vehicle body side and the piston rod 2 is coupled to the vehicle wheel side. However, the shock absorber D may be installed in an erecting manner in which the cylinder 1 is coupled to the vehicle wheel side and the piston rod 2 is coupled to the vehicle body side.

Furthermore, in the embodiment described above, the reservoir liquid chamber r1 is separated from the reservoir gas chamber r2 by the bladder 11. However, they may have a configuration in which the reservoir liquid chamber r1 is separated from the reservoir gas chamber r2 by an axially movable free piston that is in slidable contact with an inner peripheral surface of the tank T. Otherwise, the method for separating the reservoir liquid chamber r1 from the reservoir gas chamber r2 can be selected appropriately.

Moreover, in the embodiment described above, the communication passage 3 is provided with the base member flow passage 70, the first bypass flow passage B1, and the second bypass flow passage B2. The communication passage 3 is partitioned by the base member 7 and branches at the base member 7 into the base member flow passage 70, the first bypass flow passage B1, and the second bypass flow passage B2 that are arranged in parallel. However, the configuration of the communication passage 3 is not limited to the above configuration, and can be changed appropriately.

Furthermore, in the embodiment described above, the damping force generating mechanism that applies the predetermined resistance to the working fluid passing through the communication passage 3 is constituted by: the compression-side damping valve V4 and the extension-side check valve V3 provided in the base member flow passage 70; the high-speed throttle valve V6 that is arranged downstream of the compression-side damping valve V4; the low-speed throttle valve V5 provided in the first bypass flow passage B1; and the extension-side damping valve V7 provided in the second bypass flow passage B2. However, the configuration of the damping force generating mechanism is not limited to the above configuration, and can be changed appropriately.

For example, the extension-side damping valve V7 may be an extension-side check valve and the extension-side damping valve V7 may be set so as to be also opened even in a case where the stroke speed is in the low-speed range during extension of the shock absorber D. In this case, an extension-side low-speed damping force and an extension-side high-speed damping force can be simultaneously adjusted using the extension-side damping adjuster A3. Further, in a case where the extension-side damping valve V7 is the extension-side check valve, the extension-side check valve V3 of the base member 7 may be omitted.

The present application claims priority based on Japanese Patent Application No. 2013-019046 filed with the Japan Patent Office on Feb. 4, 2013, the entire content of which is incorporated into this specification by reference.

The invention claimed is:

1. A shock absorber comprising:
   a cylinder, a proximal end portion of the cylinder being coupled to one of a vehicle body side and a vehicle wheel side;
   a working fluid chamber formed in the cylinder, the working fluid chamber being filled with a working fluid;
   a piston rod configured to be movable within the working fluid chamber in an axial direction, a proximal end portion of the piston rod being coupled to the other of the vehicle body side and the vehicle wheel side;

a tank coupled to a proximal end side of the cylinder;

a reservoir formed in the tank, the reservoir being configured to reserve the working fluid therein;

a communication passage configured to cause the working fluid chamber to communicate with the reservoir;

a compression-side damping valve provided in the communication passage;

a high-speed throttle valve provided in the communication passage, the high-speed throttle valve being provided at a downstream side of the compression-side damping valve, such that the compression-side damping valve is located between the working fluid chamber and the high-speed throttle valve, when a stroke speed being in a high-speed range during compression of the shock absorber, the high-speed throttle valve applying resistance to the working fluid passing through the communication passage;

a first bypass flow passage bypassing the compression-side damping valve, the first bypass flow passage causing a first room in the working fluid chamber to communicate with the reservoir;

a second bypass flow passage bypassing the compression-side damping valve, the second bypass flow passage being provided in parallel with the first bypass flow passage, the second bypass flow passage causing the first room in the working fluid chamber to communicate with the reservoir;

a low-speed throttle valve to form an orifice, the orifice throttling the first bypass flow passage, when the stroke speed being in a low-speed range during compression of the shock absorber, the low-speed throttle valve applying resistance to the working fluid passing through the first bypass flow passage, the low-speed range representing lower speed than that in the high-speed range;

an extension-side check valve provided in the second bypass flow passage, the extension-side check valve being configured to permit the working fluid only to pass through the second bypass flow passage and move from the reservoir to the first room in the working fluid chamber, the extension-side check valve applying resistance to the working fluid passing through the second bypass flow passage;

a low-speed compression-side damping adjuster configured to drive the low-speed throttle valve and to change an opening degree of the orifice so as to change a damping force;

a high-speed compression-side damping adjuster configured to drive the high-speed throttle valve and to change an opening degree of a bore formed by the high-speed throttle valve so as to change the damping force; and an extension-side damping adjuster configured to drive the extension-side check valve and to change a valve opening pressure of a valve body provided in the extension-side check valve so as to change the damping force during extension of the shock absorber, wherein the low-speed compression-side damping adjuster, the high-speed compression-side damping adjuster, and the extension-side damping adjuster are attached to a tank side of the cylinder.

2. The shock absorber according to claim 1, further comprising a bottom cap installed from an outer air side in the communication passage, wherein the low-speed compression-side damping adjuster, the high-speed compression-side damping adjuster, and the extension-side damping adjuster are attached to the bottom cap and arranged so as to be aligned in a circumferential direction of the bottom cap.

3. The shock absorber according to claim 2, further comprising:

a piston held at a distal end of the piston rod, the piston partitioning the working fluid chamber into two rooms;

a center rod held at a side opposite from the outer air side of the bottom cap;

a base member held by the center rod, the base member partitioning the communication passage into a working fluid chamber side and a reservoir side;

a base member flow passage formed in the communication passage so as to penetrate the base member, the base member flow passage causing one of the rooms in the working fluid chamber to communicate with the reservoir, wherein the compression-side damping valve is attached to the base member, the compression-side damping valve is opened to apply resistance to the working fluid when the stroke speed of the shock absorber is in the high-speed range, the working fluid passing through the base member flow passage to move from the one of the rooms in the working fluid chamber to the reservoir, and the high-speed throttle valve is attached to the bottom cap.

4. The shock absorber according to claim 3, wherein the first bypass flow passage is configured to pass through the center rod and the bottom cap and bypass the base member flow passage; and the low-speed throttle valve is attached to the bottom cap.

5. The shock absorber according to claim 3, wherein the second bypass flow passage is configured to pass through the center rod and the bottom cap and bypass the base member flow passage, and wherein the extension-side check valve includes the valve body and a biasing spring, the valve body openably and closably sealing the second bypass flow passage, the biasing spring biasing the valve body toward a closing direction, and wherein the extension-side damping adjuster changes a spring force of the biasing spring.

* * * * *